United States Patent
Shani et al.

(10) Patent No.: US 10,783,079 B2
(45) Date of Patent: Sep. 22, 2020

(54) USER DATA RECOVERY IN A CONTENT AWARE STORAGE SYSTEM

(71) Applicant: EMC IP Holding Company LLC, Hopkinton, MA (US)

(72) Inventors: Nimrod Shani, Raanana (IL); Tal Zohar, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 16 days.

(21) Appl. No.: 16/259,099

(22) Filed: Jan. 28, 2019

(65) Prior Publication Data
US 2020/0242039 A1 Jul. 30, 2020

(51) Int. Cl.
*G06F 12/0864* (2016.01)
*G06F 12/06* (2006.01)
*H04L 9/06* (2006.01)

(52) U.S. Cl.
CPC ........ *G06F 12/0864* (2013.01); *G06F 12/063* (2013.01); *H04L 9/0643* (2013.01)

(58) Field of Classification Search
CPC ... G06F 12/0864; G06F 12/063; H04L 9/0643
See application file for complete search history.

(56) References Cited

U.S. PATENT DOCUMENTS

| | | | | |
|---|---|---|---|---|
| 8,141,149 B1* | 3/2012 | Henry | ................. | G06F 11/3068 370/394 |
| 8,417,987 B1* | 4/2013 | Goel | .................. | G06F 11/1076 714/6.1 |
| 2003/0120822 A1* | 6/2003 | Langrind | ............ | H04L 29/1232 709/251 |
| 2009/0083610 A1* | 3/2009 | Arai | ....................... | G06F 3/0608 714/807 |
| 2011/0252274 A1* | 10/2011 | Kawaguchi | ......... | G06F 11/1076 714/6.2 |
| 2015/0012503 A1* | 1/2015 | Akirav | ................ | G06F 16/1748 707/692 |
| 2018/0364917 A1* | 12/2018 | Ki | ......................... | G06F 3/0608 |

OTHER PUBLICATIONS

U.S. Appl. No. 16/260,391, filed Jan. 29, 2019, Shani et al.
U.S. Appl. No. 16/397,272, filed Apr. 29, 2019, Shani et al.

* cited by examiner

*Primary Examiner* — Nanci N Wong
(74) *Attorney, Agent, or Firm* — Daly, Crowley Mofford & Durkee, LLP

(57) ABSTRACT

A method is disclosed for recovering data, the method comprising: retrieving a mapping structure associated with a volume in a storage system, the mapping structure including a plurality of entries, each entry including a respective short hash digest of a data block stored in the volume and an identifier of a location where the data block is stored; generating a plurality of long hash digests, each of the long hash digests being generated based on a different one of a plurality of data blocks that are stored in the storage system; comparing each of the long hash digests to a short hash digest of a missing data block, and adding the long hash digest to a candidate list when the long hash digest matches the short hash digest of the missing data block; generating a filtered candidate based on the candidate list; and recovering the missing data.

20 Claims, 9 Drawing Sheets

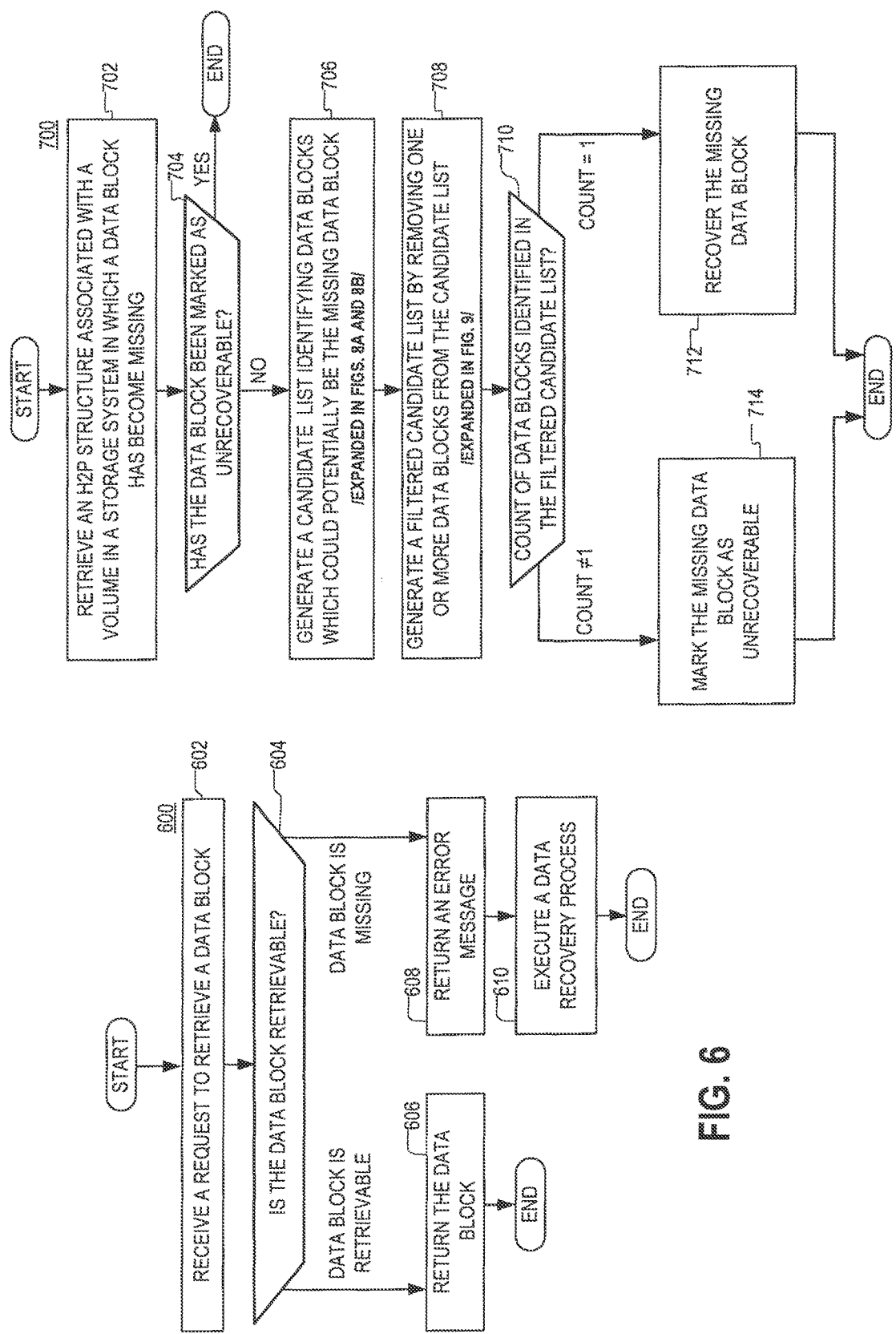

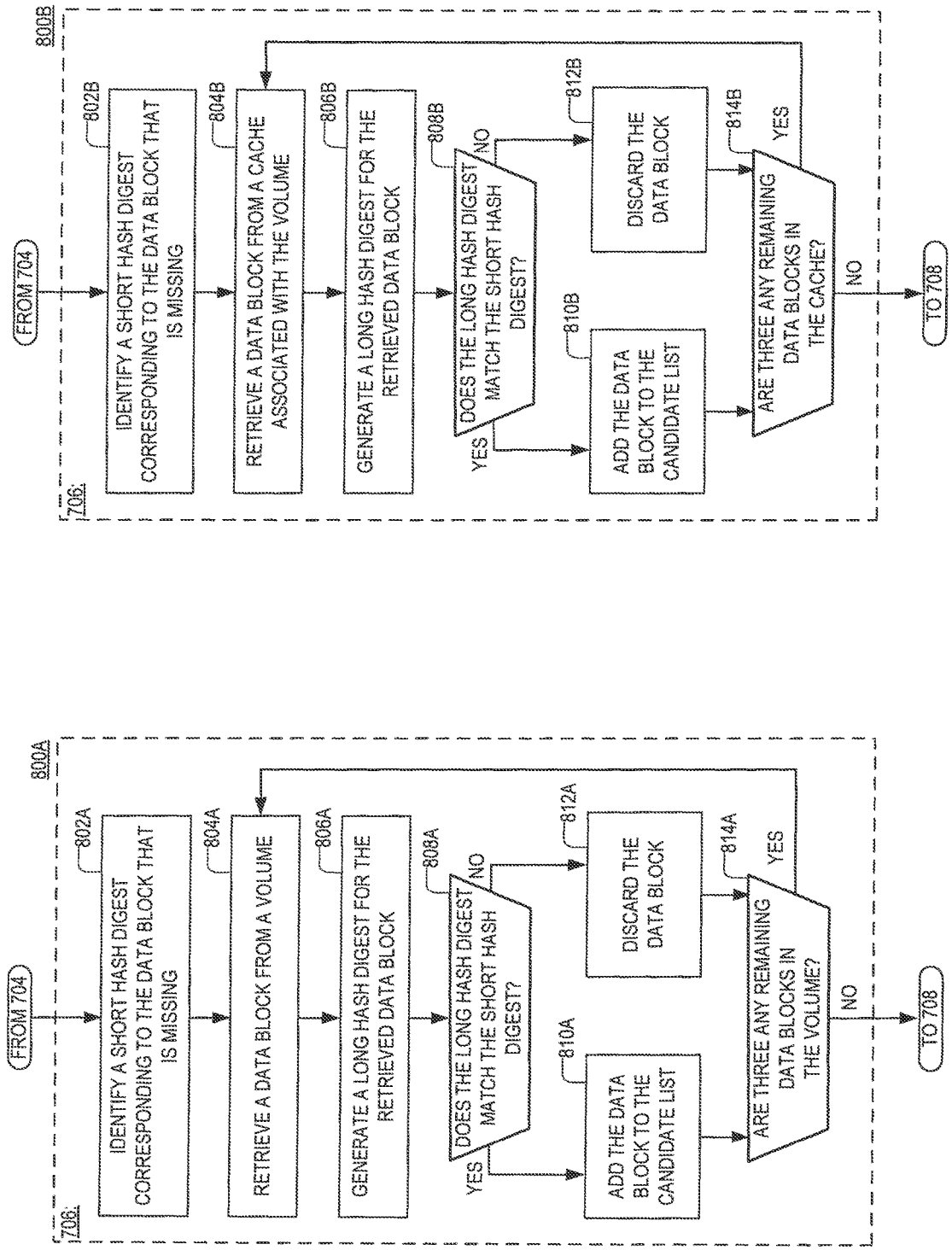

USER DATA RECOVERY IN A CONTENT AWARE STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

According to aspects of the disclosure, a method is provided for recovering data, the method comprising: retrieving a mapping structure associated with a volume in a storage system, the mapping structure including a plurality of entries, each entry including a respective short hash digest of a data block stored in the volume and an identifier of a location where the data block is stored; generating a plurality of long hash digests, each of the long hash digests being generated based on a different one of a plurality of data blocks that are stored in the storage system; comparing each of the long hash digests to a short hash digest of a missing data block, and adding the long hash digest to a candidate list when the long hash digest matches the short hash digest of the missing data block; generating a filtered candidate list by removing from the candidate list any long hash digests that match one or more of the short hash digests present in the mapping structure; and recovering the missing data block by inserting in the mapping structure a new entry that includes the short hash digest of the missing data block and an identifier of a location in the volume where a data block identified in the filtered candidate list is stored.

According to aspects of the disclosure, an apparatus for recovering data, comprising: a memory; and at least one processor operatively coupled to the memory, the at least one processor being configured to perform the operations of: retrieving a mapping structure associated with a volume in a storage system, the mapping structure including a plurality of entries, each entry including a respective short hash digest of a data block stored in the volume and an identifier of a location where the data block is stored; generating a plurality of long hash digests, each of the long hash digests being generated based on a different one of a plurality of data blocks that are stored in the storage system; comparing each of the long hash digests to a short hash digest of a missing data block, and adding the long hash digest to a candidate list when the long hash digest matches the short hash digest of the missing data block; generating a filtered candidate list by removing from the candidate list any long hash digests that match one or more of the short hash digests present in the mapping structure; and recovering the missing data block by inserting in the mapping structure a new entry that includes the short hash digest of the missing data block and an identifier of a location in the volume where a data block identified in the filtered candidate list is stored.

According to aspects of the disclosure, a non-transitory computer-readable medium, storing one or more processor-executable instructions which when executed by one or more processors cause the one or more processors to perform the operations of: retrieving a mapping structure associated with a volume in a storage system, the mapping structure including a plurality of entries, each entry including a respective short hash digest of a data block stored in the volume and an identifier of a location where the data block is stored; generating a plurality of long hash digests, each of the long hash digests being generated based on a different one of a plurality of data blocks that are stored in the storage system; comparing each of the long hash digests to a short hash digest of a missing data block, and adding the long hash digest to a candidate list when the long hash digest matches the short hash digest of the missing data block; generating a filtered candidate list by removing from the candidate list any long hash digests that match one or more of the short hash digests present in the mapping structure; and recovering the missing data block by inserting in the mapping structure a new entry that includes the short hash digest of the missing data block and an identifier of a location in the volume where a data block identified in the filtered candidate list is stored.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 6 is a flowchart of an example of a process, according to aspects of the disclosure;

FIG. 7 is a flowchart of an example of a process, according to aspects of the disclosure;

FIG. 8A is flowchart of an example of a sub-process associated with the process of FIG. 7, according to aspects of the disclosure;

FIG. 8B is a flowchart of an example of a subprocess associated with the process of FIG. 7, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
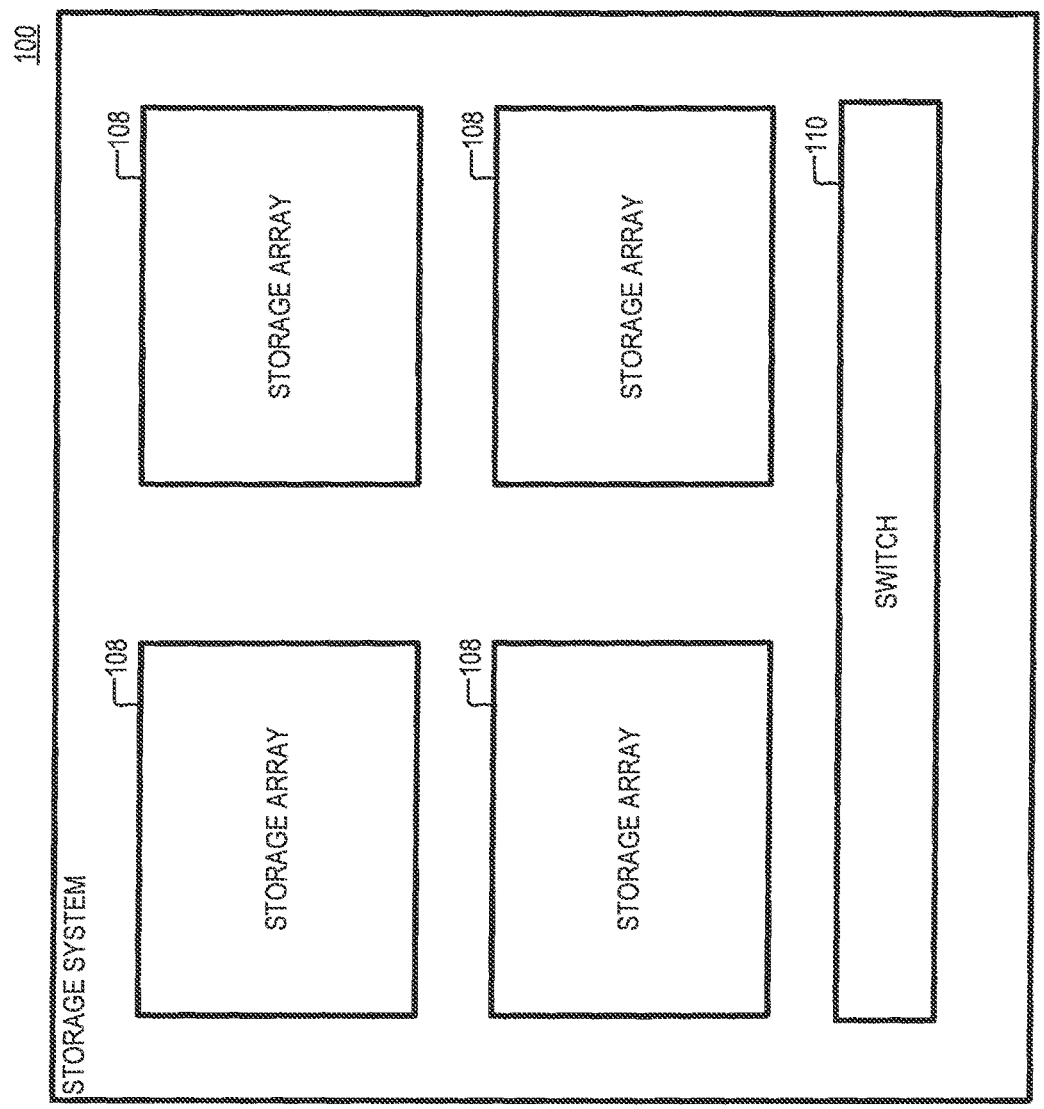
FIG. 1 is a diagram of an example of a distributed storage system, according to aspects of the disclosure.

FIG. 1 is a diagram of an example of a storage system 100, according to aspects of the disclosure. The storage system 100 may include any suitable type of storage system, such as a content-based storage system or a log structured storage system. In some implementations, the storage system 100 may include one or more storage arrays 108 coupled to one another via a network switch 110. Aspects of the operation of the storage system 100 are discussed further below with respect to FIGS. 2-10.

Figure 2:
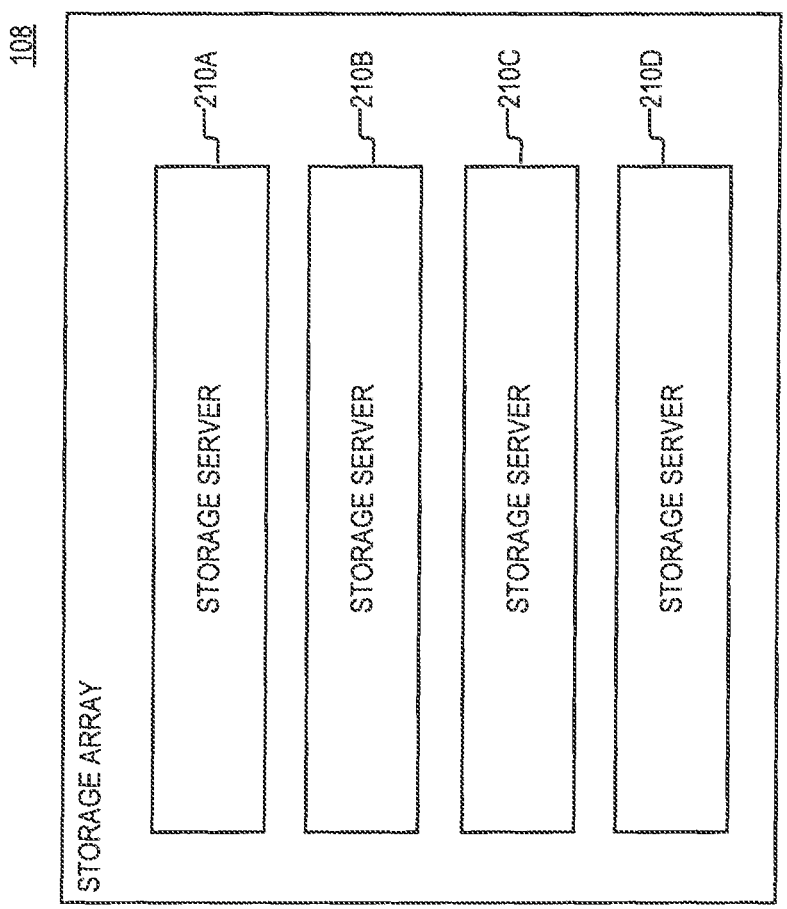
FIG. 2 is a diagram of an example of a storage array that is part of the distributed storage system of FIG. 1, according to aspects of the disclosure.

FIG. 2 is a diagram of a storage array 108 that is part of the storage system 100, according to aspects of the disclosure. The storage array 108 may include a plurality of storage servers 210 that are coupled to one another in a network (e.g., a mesh network). The network may include an InfiniBand network, a TCP/IP network, and/or any other suitable type of network. As is discussed further below, each of the storage servers 210 may be configured to execute one or more I/O providers. Each I/O provider may include one or more service processes for processing incoming I/O requests.

Figure 3:
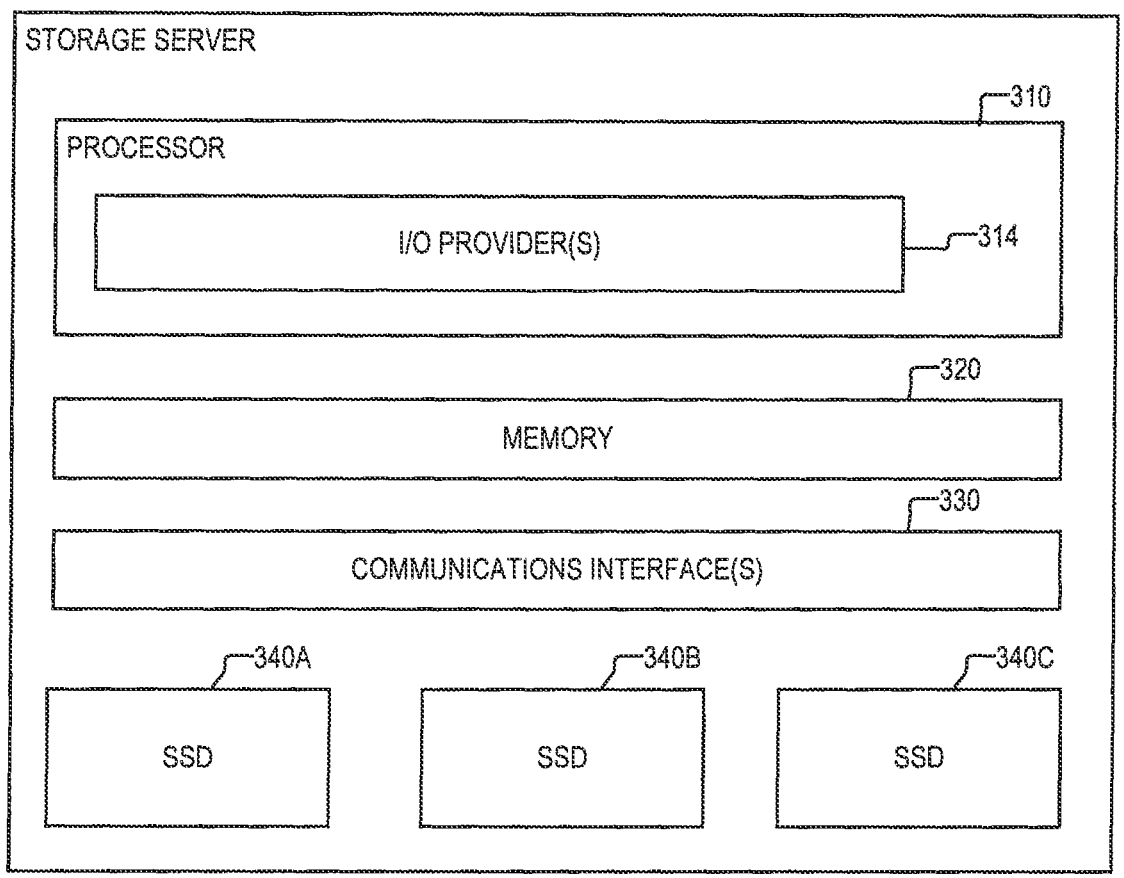
FIG. 3 is a diagram of an example of a storage server that is part of the storage array of FIG. 2, according to aspects of the disclosure.

FIG. 3 is a diagram of an example of a storage server 210, which as the numbering suggests, is representative of any of the storage servers 210A-D in the storage array 108. As illustrated, the storage server 210 may include a processor 310, a memory 320, a communications interface(s) 330, and a plurality of storage devices 340 that are operatively coupled to one another. The processor 310 may include any of one or more general-purpose processors (e.g., x86 processors, RISC processors, ARM-based processors, etc.), one or more Field Programmable Gate Arrays (FPGAs), one or more application specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. The storage devices 340 may be configured to form at least a portion of the storage system 100. In the present example, the storage devices 340 are solid state drives (SSD). However, alternative implementations are possible, in which at least one of the storage devices is a spinning hard disk (HD), a flash driver, a Read-Only Memory (ROM), a Random-Access Memory (RAM), and/or any other suitable type of volatile and non-volatile memory.

According to the present example, the processor 310 may be configured to execute at least I/O provider(s) 314. The I/O provider(s) 314 may include one or more processes for executing incoming I/O requests (e.g., write requests). Although in the present example, the I/O provider 314 is implemented in software, alternative implementations are possible in which the I/O provider 314 is implemented in hardware or as a combination of hardware and software. Stated succinctly, the present disclosure is not limited to any specific implementation of the I/O provider. As used throughout the disclosure, the term "I/O provider" may refer to any process which, alone or in combination with other processes, is configured to execute I/O requests that are received at the storage system 100, such as write requests for example.

Figure 4:
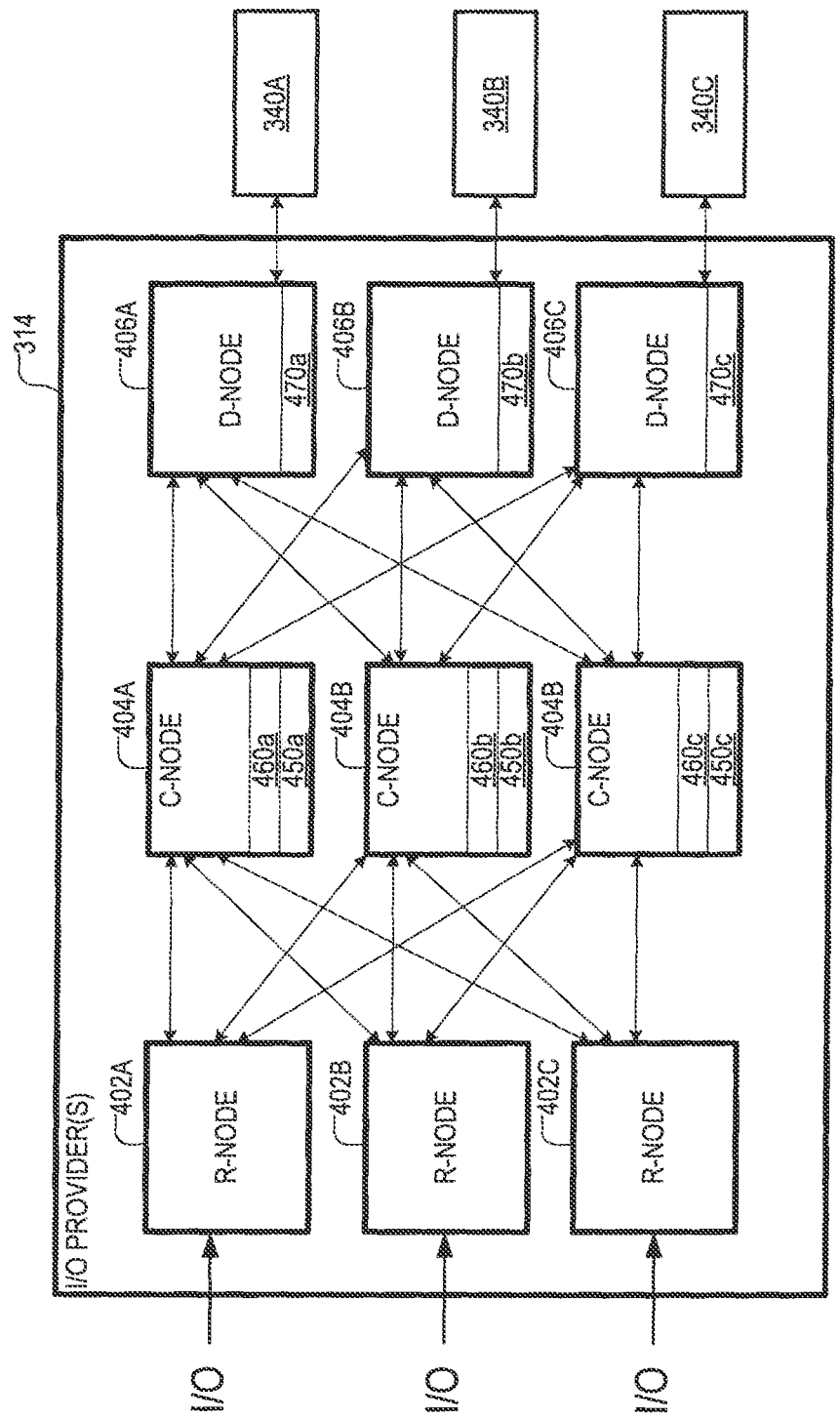
FIG. 4 is a diagram of an example of a disk I/O provider that is executed by the storage server of FIG. 3, according to aspects of the disclosure.

FIG. 4 is a diagram illustrating an example of one implementation of the I/O provider 314. According to the present example, the I/O provider 314 includes I/O providers 402, 404, and 406, which are herein referred to as routing nodes (R-nodes), control nodes (C-nodes), and data nodes (D-nodes) respectively. The R-nodes, the C-nodes, and the D-nodes are connected to one another in a mesh network (e.g., an InfiniBand network). According to the present example, the R-nodes, the C-nodes, and the D-nodes are part of the same I/O provider, and as such they are executed on the same storage server. However, it will be understood that alternative implementations are possible in which at least some of the R-nodes, the C-nodes, and the D-nodes are executed on different storage servers and/or are part of different I/O providers.

The R-nodes 402 may be configured to terminate I/O requests received at the storage system 100 and route them to appropriate C-nodes 404 and D-nodes 406 for further execution. In doing so, the R-nodes 402 may distribute a workload over multiple C-nodes 404 and D-nodes 406. In some implementations, any of the R-nodes 402 may be configured to write I/O requests (e.g., SCSI I/O requests) to selected ones of the C-nodes 404 for further processing.

The C-nodes 404 may be configured to control the execution of control node commands supplied by the R-nodes 402. The control node commands may be used to implement read requests, write requests, and/or any other suitable type of I/O request. Each of the C-nodes 404 may be configured to receive control node commands from the R-nodes and communicate with the D-nodes 406 to execute the commands. In some implementations, each C-node 404 may maintain an address-to-hash (A2H) structure 460 mapping logical block addresses (LBAs) to short hash digests of data blocks and a hash-to-D-node (H2D) structure 450 that maps short hash digests to the addresses of D-nodes.

Each of the D-nodes 406 may be attached to one or more of the storage devices 340. Each of the data nodes may store in memory a hash-to-physical-address (H2P) structure 470. The H2P structure 470 may identify a plurality of physical addresses in the storage devices 340, and a different respective short hash digest that is mapped to each of the physical addresses. An example of one possible implementation of the H2P structure is discussed further below with respect to FIGS. 5A-B In operation, any of the R-nodes 402 may receive, from a multipath agent, a read request for a data payload that spans a range of LBAs. In response to the request, the R-node 402 may decompose the read request into a plurality of control node commands and forward the control node commands to different C-nodes 404 for further processing. In some implementations, each of the control node commands may request its recipient C-node to provide a portion of the data associated with the read request.

In operation, any of the C-nodes 404 may receive a control node command that is generated by one of the routing nodes 402. The control node command may request of the C-node to provide a portion of the data payload associated with the read request received at the R-node, and it may include an LBA associated with the payload portion. In response to receiving the control node command, the node 404 may use the A2H structure 460 to identify one or more short hash digests corresponding to the LBA, and then use the H2D structure to identify one or more D-nodes associated with the short hash digests. Afterwards, the C-node 404 may decompose the control node command into a plurality of data node commands and forward each of the data node commands to respective ones of the D-nodes that are identified based on the A2H structure 460 and H2D structure 470.

In operation, any of the D-nodes 406 may receive a data node command that is generated by one of the C-nodes 404. The data node command may include a request for a data block (e.g., 4 KB of data) and it may include a short hash digest of the data block (e.g., a short hash digest retrieved from the A2H structure 460). Next, the D-node 406 may search its respective H2P structure 470 to identify a physical address in one of the storage devices 340 that corresponds to the short hash digest that is contained in the data node command. As a result of the search, the D-node 406 may obtain from its respective H2P structure 470 the physical address of the requested data block. Afterwards, the D-node may use the obtained address of the data block to retrieve the data block from the storage device (e.g., an SSD) where the data block is stored. After the data block is retrieved, the D-node may forward the data block to the sender of the data node command.

The example above describes a situation in which the requested data block is available. However, other situations are possible in which the requested data block is missing and cannot be retrieved successfully. Such situations may arise when the data block is accidentally deleted by a user or when a malfunction in the storage system causes the data block to seemingly disappear. When the data block is missing, the search of the H2P table by the C-node may fail to produce useful results, and the C-node 406 may return an error message to the sender of the data node command indicating that the requested data block cannot be retrieved.

When a data block is missing, a procedure may be carried in an attempt to recover the data block. In some storage systems, unreferenced data blocks are not directly overwritten, as long as there are free ones, and deleted data usually remains present in physical storage (e.g., in a storage volume or in a cache associated with the storage volume) until it is either overwritten or cleaned by a garbage collector. In this regard, if the procedure is executed before the missing data block is overwritten or cleaned by a garbage collector, the missing data block may be recovered. An example of a process for recovering missing data blocks is discussed further below with respect to FIGS. 5A-9.

Figures 5A, 5B:
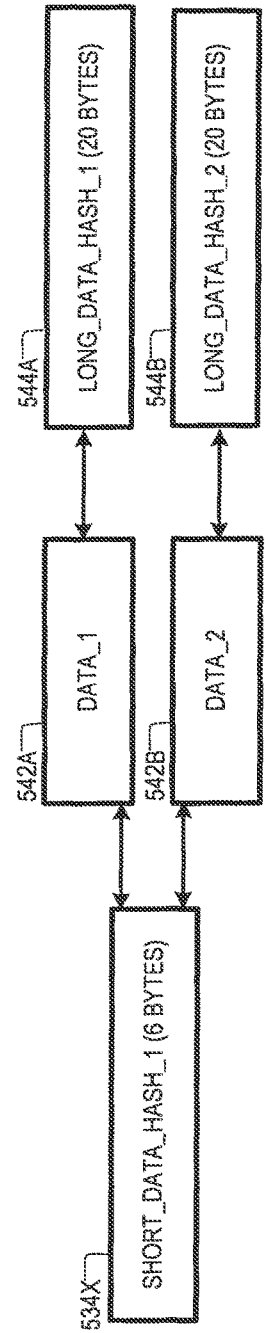
FIG. 5A is a diagram of an H2P structure, according to aspects of the disclosure.
FIG. 5B is a diagram illustrating the relationship between long and short hash digests of data blocks, according to aspects of the disclosure.

FIG. 5A shows an example of the H2P structure 470, according to aspects of the disclosure. The H2P structure 470 may include one or more entries 532 and one or more entries 538. Each entry 532 may map a short hash digest 534 of a given data block to a corresponding physical address 536 of the location in the storage system 100 where the data block is stored. As discussed above, the entries 532 may be used when requests to read data are serviced by D-nodes in the storage system. Each of the read requests may provide the short hash digest of a requested data blocks, and the entries 532 may be used to identify the physical location, based on the provided short hash digest, where the data block is stored and subsequently retrieve the data block.

Each of the entries 538 may map a short hash digest 534 of a given data block and a marker 539 indicating that the data block is unrecoverable. In some implementations, each of the entries 538 may be inserted in the H2P structure 470 after an unsuccessful attempt is made to recover the data block identified by the short hash digest 534 in the entry 538 (e.g., by executing the process 700 shown in FIG. 7). In some implementations, each entry 538 may be inserted in the H2P structure to prevent repeated recovery attempts for the same data block.

In some implementations, the recovery of a missing data block will be attempted only once, only when the H2P structure does not include an entry 538 marking the data missing data block as unrecoverable. If the recovery attempt is unsuccessful, an entry 538 may be inserted in the H2P structure 470 which includes the short hash digest of the missing data block and marks the data block as irretrievable. Following the insertion of this entry 538, no subsequent attempts would be made to retrieve the missing data block, in the event that subsequent read requests/commands for the missing data block are received. On the other hand, if the recovery attempt is successful, a new entry 532 may be generated and inserted into the H2P structure, which includes the short hash digest of the missing data block and the physical address at which the data block is stored. The short hash digest of the missing data block may be provided in a read request/command for the missing data block. And the physical address of the missing data block may be recovered by using the process 700, which is discussed further below with respect to FIG. 7.

Shown in FIG. 5B are data blocks 542A and 542B, which are different from one another. According to the present example, the data blocks 542A and 542B are 4 KB each. However, it will be understood that the present disclosure is not limited to any specific size of the data blocks 542A and 542B. A long hash digest 544A may be generated based on the data block 542A and a long hash digest 544B may be generated based on the data block 542B. The long hash digests 544A and 544B may be different from one another. The long hash digest 544A and 544B may be generated using the SHA-1 hashing function and/or any other suitable type of function. According to the present example, each of the long hash digests 544A and 544B may be 20 bytes long.

The data blocks 542A and 542B may be associated with same short hash digest 534X. The short hash digest of any data block may be derivative from the data block's long hash digest. According to the present example, the short hash digest 534X may be identical to the last 6 bites of either of the long hash digests 544A and 544B. Using short hash-digests in the A2H, H2D, and H2P structures is advantageous because it can reduce the amount of RAM needed to store those structures. When data blocks stored in the storage system 100 have the same short hash digest, the H2P structure 470 may include multiple entries 532 that contain the same short hash digest. Each entry 532 may correspond to a different one of the data blocks. As such, each entry 532 may include the same hash digest and a different physical address where the data block corresponding to the entry is stored.

When a read request/command is received at a C-node, the C-node may search the H2P structure 470 based on a short hash digest provided with the read request/command. In response to the search, the C-node may determine that multiple entries exist in the H2P structure 470 that include the short hash digest and execute a collision resolution routine to determine which one of the entries corresponds to the read request/command. The collision resolution routine may be executed in a well-known fashion based on other metadata (not shown) that is stored in the H2P structure 470 or elsewhere in the storage system.

According to aspects of the disclosure, long hash digests of data blocks may be compared to short hash digests of the data blocks. For example, if the last 6 bytes of a long hash digest are the same as a short hash digest, the long hash digest and the short hash digest are said to match one another—which is an indication of a high likelihood of the short hash digest and the long hash digest being generated based on the same data block. As another example, if the last 6 bytes of a long hash digest are not the same as a short hash digest, the long hash digest and the short hash digest are said to not match one another—which is an indication of that the short hash digest and the long hash digest have not been generated based on the same data block. FIGS. 5A-B are provided as an example only. It will be understood that the present disclosure is not limited to any specific method for generated long hash digests or short hash digests of data blocks. Furthermore, it will be understood that the present disclosure is not limited to any specific method for comparing long hash digests to short digests.

FIG. 6 is a flowchart of a process 600, according to aspects of the disclosure. At step 602, a request to retrieve a data block is received at a node in a storage system. The request may be one that is received at the storage system from a host device, or one that is generated based on a request received from a host device. At step 604, a determination is made if the data block can be retrieved. If the data node can be retrieved, the process 600 proceeds to step 606. If the data block cannot be retrieved, perhaps because it was deleted by accident, the process 600 proceeds to step 608. At step 606, the data block is retrieved from the physical location where it is stored and returned to the sender of the request. At step 608, an error message is generated indicating that the data block is missing, after which the error message is returned to the sender of the request. At step 610, a data recovery process is executed to attempt to recover the data block. In some implementations, the data recovery process may be the same or similar to the process 700, which is discussed further below with respect to FIG. 7. The data recovery process may be performed either contemporaneously with the receipt of the request or at a later time, as part of a broader data recovery effort. According to the present example, the storage system is the same or similar to the storage system 100, the node is a D-node, and the request is a D-node command. However, it will be understood that the present disclosure is not limited to any specific type of storage system, any specific type of request to retrieve data, and/or any specific recipient for the request.

FIG. 7 is a flowchart of an example of a data recovery process 700, according to aspects of the disclosure.

At step 702, an H2P structure is obtained that is associated with a volume in a content-addressable storage (CAS) system from which a data block is missing. In some implementations, the storage system may be the same or similar to the storage system 100, and the volume may be implemented using one or more SSDs that are part of the storage system. The H2P structure may include any suitable data structure that maps each of a plurality of short hash digests of data blocks stored in the volume to the respective physical address where the data block is stored. In some implementations, the H2P structure may be the same or similar to the H2P structure 470, which is discussed above with respect to FIG. 5A.

As noted above, the data block may be discovered to be missing when a read request/command is received for the data block and a subsequent search of the H2P structure (and/or other structures) fails to return a physical address for the data block. The read request/command may provide a short hash digest of the missing data block. The search of the H2P table may be performed at least partially based on the provided short hash digest. In this regard, in some implementations, a data block may be considered missing when the H2P structure does not contain an entry that maps the short hash digest of the data block to a physical address (or another type of address) in the volume.

At step 704, a determination is made if the missing data block has been marked as unrecoverable. In some implementations, the determination may be made by searching the H2P structure to determine if the H2P structure contains an entry indicating that the missing data block is unrecoverable. The search may be performed based on the short hash digest of the missing data block. The entry indicating that the missing data block is unrecoverable may be the same or similar to the entry 538, which is discussed above with respect to FIG. 5A. If the H2P structure includes an entry indicating that the data block is unrecoverable, the process 700 is terminated. Otherwise, if the H2P structure does not include an entry indicating that the data block is unrecoverable, the process 700 proceeds to step 706.

At step 706, a candidate list is generated that identifies one or more data blocks which could potentially be the missing data block. According to the present example, the data blocks are identified in the candidate list by using respective long hash digests of the data blocks. However, alternative implementations are possible in which the data blocks are identified in the candidate list by using another type of identifier. In some implementations, the candidate list may be generated by: (i) scanning a volume and/or a cache associated with the volume to identify each (or at least some) of the data blocks that are stored in the volume and/or cache, (ii) generating a respective long hash digest of each one of the identified data blocks, (iii) comparing the generated long hash digests against the short hash digest of the missing data block, and (iv) storing in the candidate list all long hash digests that match the short hash digest. In some implementations, when there are no matching long hash digests that match the short hash digest, the candidate list may be empty. In other instances, because hash digests are a more-dense representation of data, the candidate list may include multiple long hash digests that match the short digest. Step 706 may be performed by executing one or both of the processes discussed further below with respect to FIGS. 8A-B.

At step 708, a filtered candidate list is generated based on the candidate list. In some implementations, the filtered candidate list may be generated by removing from the candidate list any data blocks that are represented in the H2P structure. A data block may be represented in the H2P structure when the H2P structure includes an entry mapping the short hash digest of the data block to a location in the volume where the data block is stored. A data block may be removed from the candidate list by deleting from the candidate list a long hash digest (or another type of identifier) corresponding to the data block. The filtered candidate list may be either the portion of the candidate list that remains after one or more data blocks have been removed from the candidate list or a data structure that is instantiated separately from the candidate list. According to aspects of the disclosure, when the candidate list is empty or contains only one entry, step 706 may be omitted. The manner in which step 706 is performed is discussed further below with respect to FIG. 9.

At step 710, a determination is made if the filtered candidate list identifies only one data block. As noted above, data blocks may be identified in the candidate list by their long hash digests (or another type of data block identifier). If the candidate list includes only one long hash digest of a data block (or another type of data block identifier), this is an indication that missing data block matches only one of the data blocks that are present in the volume, or the volume's cache, leading to the conclusion that the matching data block (i.e., the data black identified by the filtered candidate list) is the data block that is missing. Otherwise, if the candidate list includes multiple long hash digests, this is an indication that the missing data block cannot be definitively matched to a single one of the data blocks that are present in the volume or the volume's cache, and the process 700 proceeds to step 714. Furthermore, if the filtered candidate list is empty, this is an indication that the missing data block cannot be matched to any of the data blocks that are present in the volume, or the volume's cache, and the process 700 proceeds to step 714.

At step 712, the missing data block is recovered. Recovering the missing data block may include generating a new first entry corresponding to the data block and adding the new first entry to the H2P structure. The new first entry may be the same or similar to any of the entries 532, which are discussed with respect to FIG. 5A, and can be subsequently used to retrieve the missing data block from the volume. The new first entry may include the short hash digest of the missing data block and an identifier of the location in the volume where the data block identified in the filtered candidate list is stored. The identifier of the location where the data block identified in the filtered candidate list is stored may include a physical location identifier and/or any other suitable type of location identifier. In some implementations, recovering the data block may also include detecting whether the data block identified by the candidate list is located in a cache associated with the volume. When the data block identified by the candidate list is located in the volume's cache, the data block identified by the candidate list can be copied from the cache to the volume before the new first entry is generated and added to the H2P structure.

At step 714, the missing data block is marked as unrecoverable. Marking the missing data block as unrecoverable may include generating a new second entry corresponding to the data block and adding the new first entry to the H2P structure. The new second entry may be the same or similar to the entry 538, which is discussed with respect to FIG. 5A. The new first entry may include the short hash digest of the missing data block and a marker indicating the missing data block is unrecoverable. Marking the missing data block as unrecoverable is advantageous because it can prevent the process 700 from being executed multiple times for the missing data block, when subsequent requests to retrieve the data block are received from a host device.

FIG. 8A is a flowchart of an example of a process for generating a candidate list, as specified by step 704 of the process 700. At step 802A, a short hash digest for the missing data block is obtained. The short hash digest may be obtained from a request to retrieve the data block or in any other suitable manner. At step 804A, a data block is retrieved from the volume. At step 806A, a long hash digest of the data block is generated. At step 808A, the long hash digest is compared to the short hash digest, and a determination is made if the long hash digest matches the short digest. If the long hash digest matches the short digest, the process proceeds to step 810A. Otherwise, if the long hash digest does not match the short hash digest, the process proceeds to step 812A. At step 810A, the retrieved data block is added to the candidate list. Adding the retrieved data block to the candidate list may including adding the long hash digest of the retrieved data block to the candidate list. In some implementations, in addition to the long hash digest, an identifier of the location (e.g., a physical address identifier) where the retrieved data block is stored may also be added to the candidate list. In some implementations, the identifier of location may be stored in the candidate list in such a way that it is mapped to the long hash digest. Although in the present example, the long hash digest of the retrieved data block is added to the candidate list, alternative implementations are possible in which any other suitable type of identifier of the retrieved data block is added to the candidate list instead of, or in addition to, the long hash digest. At step 812A, the retrieved data block is discarded. At step 814A, a determination is made if there are any data blocks in the volume that have not been processed yet. If there are remaining data blocks, the process returns to step 804A, and steps 804A-814A are performed for another data block in the volume. Otherwise, if there are no remaining data blocks, the process proceeds to step 708. In some implementations, steps 802A-812A may be performed for each and every data block that is present in the volume. Alternatively, in some implementations, steps 802A-812A may be performed for only some of the data blocks that are present in the volume.

FIG. 8B is a flowchart of an example of a process for generating a candidate list, as specified by step 704 of the process 700. At step 802B, a short hash digest for the missing data block is obtained. The short hash digest may be obtained from a request to retrieve the data block or in any other suitable manner. At step 804B, a data block is retrieved from a cache associated with the volume. At step 806B, a long hash digest of the data block is generated. At step 808B, the long hash digest is compared to the short hash digest, and a determination is made if the long hash digest matches the short digest. If the long hash digest matches the short digest, the process proceeds to step 810B. Otherwise, if the long hash digest does not match the short hash digest, the process proceeds to step 812B. At step 810B, the retrieved data block is added to the candidate list. Adding the retrieved data block to the candidate list may including adding the long hash digest of the retrieved data block to the candidate list. In some implementations, in addition to the long hash digest, an identifier of the location (e.g., a physical address identifier) where the retrieved data block is stored may also be added to the candidate list. In some implementations, the identifier of location may be stored in the candidate list in such a way that it is mapped to the long hash digest. Although in the present example, the long hash digest of the retrieved data block is added to the candidate list, alternative implementations are possible in which any other suitable type of identifier of the retrieved data block is added to the candidate list instead of, or in addition to, the long hash digest. At step 812B, the retrieved data block is discarded. At step 814B, a determination is made if there are any data blocks in the cache that have not been processed yet. If there are remaining data blocks, the process returns to step 804B, and steps 804B-814B are performed for another data block in the cache. Otherwise, if there are no remaining data blocks, the process proceeds to step 708. In some implementations, steps 802B-812B may be performed for each and every data block that is present in the cache. Alternatively, in some implementations, steps 802A-812A may be performed for only some of the data blocks that are present in the cache.

Figure 9:
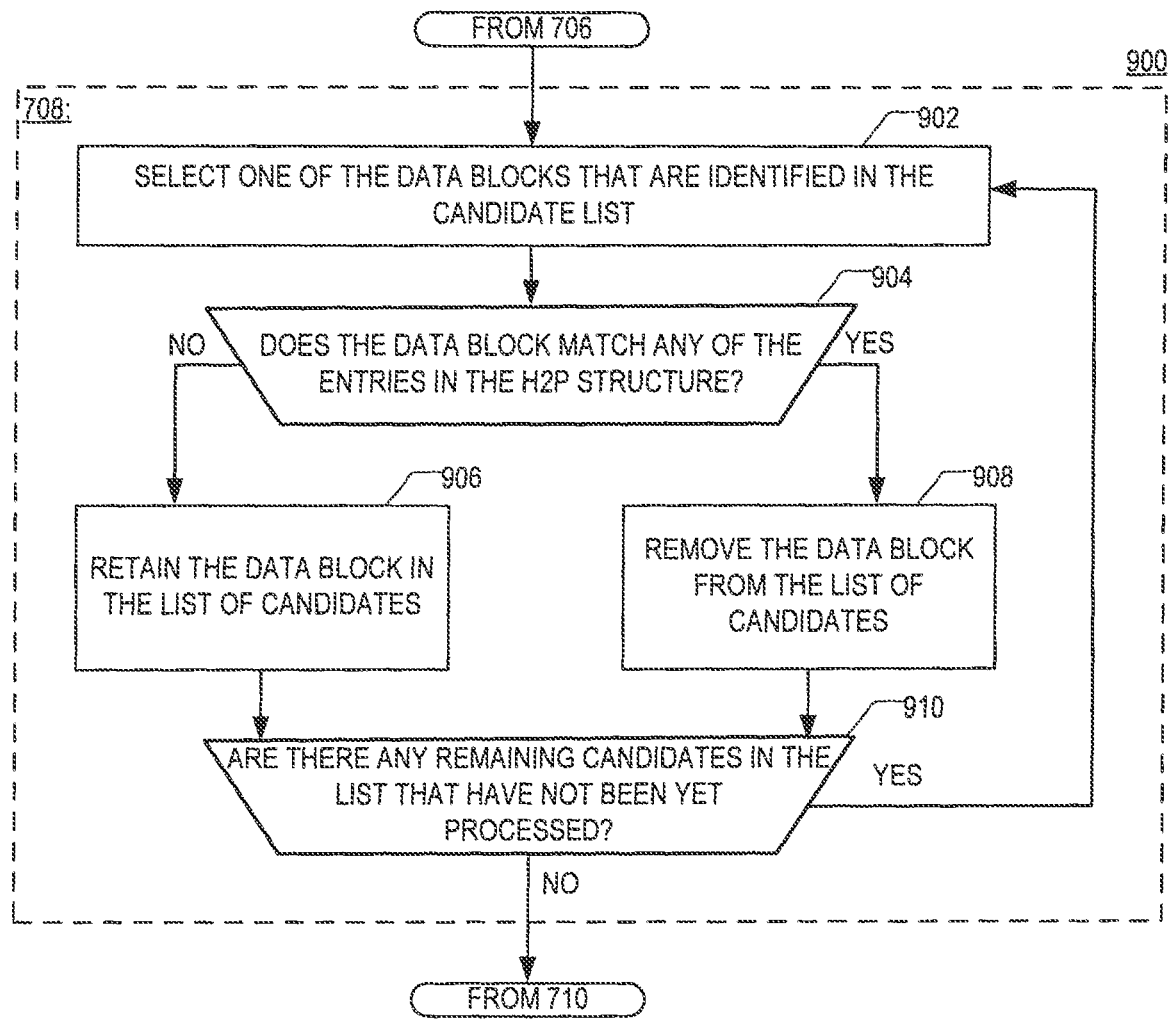
FIG. 9 is a flowchart of an example of a subprocess associated with the process of FIG. 7, according to aspects of the disclosure.

FIG. 9 is a flowchart of an example of a process for filtering a candidate list, as specified by step 708 of process 700. At step 902, a data block identified in the candidate list is selected. In some implementations, selecting the data block may include retrieving a long hash digest of the data block from the candidate list. At step 904 a search is performed of the H2P structure to determine whether the data block is identified in the H2P structure. In some implementations, the search may be performed by using the long hash digest of the data block as a search key. In some implementations, the data block may be identified in the H2P structure only when the H2P structure includes an entry containing a short hash digest that matches the long hash digest of the data block, which is present in the candidate list. Additionally or alternatively, in some implementations, the data block may be identified in the H2P structure when the H2P structure includes an entry that can be used (alone or in combination with metadata for resolving conflicts) to retrieve the data block from the physical location where the data block is stored. If the data block does not match any of the entries in the H2P structure, the process proceeds to step 906. Otherwise, if the data block matches any of the entries in the H2P structure, the process proceeds to step 908. At step 906, the data block is retained in the candidate list. At step 908, the data block is removed from the candidate list. In some implementations, removing the data block may include deleting from the candidate list the long hash digest (or another identifier) of the data block. At step 910, a determination is made if there are any data blocks in the candidate list that remain to be processed. If there are data blocks in the candidate list that remain to be processed, the process 900 returns to step 902, and steps 902-910 are performed for another data block in the candidate list. Otherwise, if no data blocks remain to be processed, the process 900 proceeds to step 710.

Figure 10:
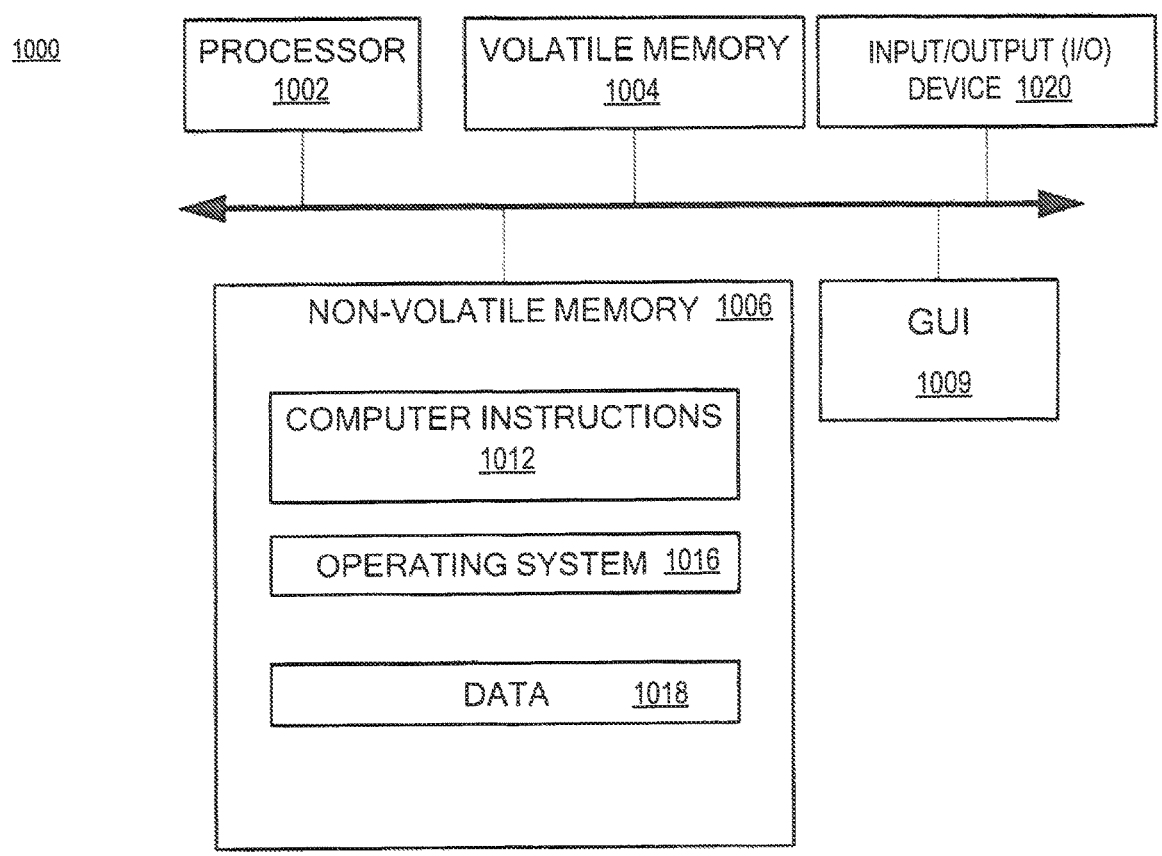
FIG. 10 is a diagram of an example of a computing device, according to aspects of the disclosure

Referring to FIG. 10, in some embodiments, source site 102 and/or target site 112 may be implemented as one or more computers. Computer 1000 may include processor 1002, volatile memory 1004 (e.g., RAM), non-volatile memory 10016 (e.g., a hard disk drive, a solid state drive such as a flash drive, a hybrid magnetic and solid state drive, etc.), graphical user interface (GUI) 1009 (e.g., a touchscreen, a display, and so forth) and input/output (I/O) device 1020 (e.g., a mouse, a keyboard, etc). Non-volatile memory 1006 stores computer instructions 1012, an operating system 1016 and data 1018 such that, for example, the computer instructions 1012 are executed by the processor 1002 out of volatile memory 1004 to perform at least a portion of 600-900. Program code may be applied to data entered using an input device of GUI 1009 or received from I/O device 1020.

Processes 600-900 are not limited to use with the hardware and software of FIG. 10 and may find applicability in any computing or processing environment and with any type of machine or set of machines that may be capable of running a computer program. Processes 600-900 may be implemented in hardware, software, or a combination of the two.

The processes described herein are not limited to the specific embodiments described. For example, processes 600-900 are not limited to the specific processing order shown in FIGS. 4 and 5. Rather, any of the blocks of processes 600-900 may be re-ordered, combined or removed, performed in parallel or in serial, as necessary, to achieve the results set forth herein.

Processor 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid-state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A method for recovering data, the method comprising:
retrieving a mapping structure associated with a volume in a storage system, the mapping structure including a plurality of entries, each entry including a respective short hash digest of a data block stored in the volume and an identifier of a location where the data block is stored;
generating a plurality of long hash digests, each of the long hash digests being generated based on a different one of a plurality of data blocks that are stored in the storage system;
comparing each of the long hash digests to a short hash digest of a missing data block, and adding the long hash digest to a candidate list when the long hash digest matches the short hash digest of the missing data block;
generating a filtered candidate list by removing from the candidate list any long hash digests that match one or more of the short hash digests present in the mapping structure; and
recovering the missing data block based on the filtered candidate list, the recovering being performed by inserting in the mapping structure a new entry that includes the short hash digest of the missing data block and an identifier of a location in the volume where a data block is stored, the data block being identified by a corresponding long hash digest that is part of the filtered candidate list, the recovering being performed only when the corresponding long hash digest is the only long hash digest that is present in the filtered candidate list.

2. The method of claim 1, further comprising, when the filter candidate list includes no long hash digests or more than one long hash digest, marking the missing data block as unrecoverable.

3. The method of claim 1, wherein at least some of the plurality of long hash digests are generated based on data blocks stored in a cache associated with the volume.

4. The method of claim 1, wherein generating the plurality of long hash digests includes:
scanning the volume and a cache associated with the volume to identify a plurality of data blocks that are stored in the volume and the cache, and
generating a respective long hash digest of each of the plurality of data blocks that are stored in the volume and the cache.

5. The method of claim 1, wherein generating the filtered candidate list includes performing a plurality of searches of the mapping structure, each search being performed by using, as a search key, a different one of the long hash digests identified in the candidate list.

6. The method of claim 1, wherein recovering the missing data block, further includes detecting whether the data block identified in the filtered candidate list is currently located in a cache associated with the volume, and copying the data block that is identified in the filtered candidate list from the cache to the volume.

7. The method of claim 1, wherein the mapping structure includes a hash-to-physical address (H2P) structure, and a data block is identified in the filtered candidate list when the filtered candidate list contains a long hash digest of the data block.

8. An apparatus for recovering data, comprising:
a memory; and
one or more processors operatively coupled to the memory, the one or more processors being configured to perform the operations of:
retrieving a mapping structure associated with a volume in a storage system, the mapping structure including a plurality of entries, each entry including a respective short hash digest of a data block stored in the volume and an identifier of a location where the data block is stored;
generating a plurality of long hash digests, each of the long hash digests being generated based on a different one of a plurality of data blocks that are stored in the storage system;
comparing each of the long hash digests to a short hash digest of a missing data block, and adding the long hash digest to a candidate list when the long hash digest matches the short hash digest of the missing data block;
generating a filtered candidate list by removing from the candidate list any long hash digests that match one or more of the short hash digests present in the mapping structure; and
recovering the missing data block based on the filtered candidate list, the recovering being performed by inserting in the mapping structure a new entry that includes the short hash digest of the missing data block and an identifier of a location in the volume where a data block is stored, the data block being identified by a corresponding long hash digest that is part of the filtered candidate list, the recovering being performed only when the corresponding long hash digest is the only long hash digest that is present in the filtered candidate list.

9. The apparatus of claim 8, wherein the one or more processors are further configured to perform the operation of marking the missing data block as unrecoverable, when the filter candidate list includes no long hash digests or more than one long hash digest.

10. The apparatus of claim 8, wherein at least some of the plurality of long hash digests are generated based on data blocks stored in a cache associated with the volume.

11. The apparatus of claim 8, wherein generating the plurality of long hash digests includes:
scanning the volume and a cache associated with the volume to identify a plurality of data blocks that are stored in the volume and the cache, and
generating a respective long hash digest of each of the plurality of data blocks that are stored in the volume and the cache.

12. The apparatus of claim 8, wherein generating the filtered candidate list includes performing a plurality of searches of the mapping structure, each search being performed by using, as a search key, a different one of the long hash digests identified in the candidate list.

13. The apparatus of claim 8, wherein recovering the missing data block, further includes detecting whether the data block identified in the filtered candidate list is currently located in a cache associated with the volume, and copying the data block that is identified in the filtered candidate list from the cache to the volume.

14. The apparatus of claim 8, wherein the mapping structure includes a hash-to-physical address (H2P) structure, and a data block is identified in the filtered candidate list when the filtered candidate list contains a long hash digest of the data block.

15. A non-transitory computer-readable medium, storing one or more processor-executable instructions which when executed by one or more processors cause the one or more processors to perform the operations of:
retrieving a mapping structure associated with a volume in a storage system, the mapping structure including a plurality of entries, each entry including a respective short hash digest of a data block stored in the volume and an identifier of a location where the data block is stored;

generating a plurality of long hash digests each of the long hash digests being generated based on a different one of a plurality of data blocks that are stored in the storage system;

comparing each of the long hash digests to a short hash digest of a missing data block, and adding the long hash digest to a candidate list when the long hash digest matches the short hash digest of the missing data block;

generating a filtered candidate list by removing from the candidate list any long hash digests that match one or more of the short hash digests present in the mapping structure; and recovering the missing data block based on the filtered candidate list, the recovering being performed by inserting in the mapping structure a new entry that includes the short hash digest of the missing data block and an identifier of a location in the volume where a data block is stored, the data block being identified by a corresponding long hash digest that is part of the filtered candidate list, the recovering being performed only when the corresponding long hash digest is the only long hash digest that is present in the filtered candidate list.

16. The non-transitory computer-readable medium of claim 15, wherein the one or more processor-executable instructions, when executed by one or more processors further cause the one or more processors to perform the operation of marking the missing data block as unrecoverable, when the filter candidate list includes no long hash digests or more than one long hash digest.

17. The non-transitory computer-readable medium of claim 15, wherein at least some of the plurality of long hash digests are generated based on data blocks stored in a cache associated with the volume.

18. The non-transitory computer-readable medium of claim 15, wherein generating the plurality of long hash digests includes:
  scanning the volume and a cache associated with the volume to identify a plurality of data blocks that are stored in the volume and the cache, and
  generating a respective long hash digest of each of the plurality of data blocks that are stored in the volume and the cache.

19. The non-transitory computer-readable medium of claim 15, wherein generating the filtered candidate list includes performing a plurality of searches of the mapping structure, each search being performed by using, as a search key, a different one of the long hash digests identified in the candidate list.

20. The non-transitory computer-readable medium of claim 15, wherein recovering the missing data block, further includes detecting whether the data block identified in the filtered candidate list is currently located in a cache associated with the volume, and copying the data block that is identified in the filtered candidate list from the cache to the volume.

* * * * *